US006060700A

United States Patent [19]

Perlman et al.

[11] Patent Number: 6,060,700

[45] **Date of Patent: *May 9, 2000**

[54] MICROWAVE OVEN WITH REMOVABLE STORAGE CASSETTE IN DASHBOARD OF MOTOR VEHICLE

[75] Inventors: Daniel Perlman; Jane Ilene Katims, both of 94 Oakland Ave., Arlington, Mass. 02174

[73] Assignees: Daniel Perlman; Jane Ilene Katims, both of Arlington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/659,036

[22] Filed: Jun. 3, 1996

[51] Int. Cl.[7] ................................ H05B 6/80; B60N 3/16

[52] U.S. Cl. .......................... 219/679; 219/722; 219/756; 219/763; 219/202; 99/DIG. 14; 296/37.12; 296/70

[58] Field of Search .................................... 219/679, 704, 219/722, 723, 724, 728, 729, 725, 732, 756, 762, 202, 763; 99/DIG. 14, 451; 296/190, 24.1, 37.12, 37.8, 70, 72

[56] References Cited

U.S. PATENT DOCUMENTS

| | | | |
|---|---|---|---|
| 3,271,169 | 9/1966 | Baker et al. | 219/729 |
| 3,700,846 | 10/1972 | Ishikawa et al. . | |
| 3,823,294 | 7/1974 | Takayama et al. . | |
| 3,936,626 | 2/1976 | Moore | 219/729 |
| 4,201,415 | 5/1980 | Suchanek | 296/190 |
| 4,201,901 | 5/1980 | Schubert . | |
| 4,450,335 | 5/1984 | Shimizu et al. . | |
| 4,471,195 | 9/1984 | Ishii et al. | 219/762 |
| 4,481,395 | 11/1984 | Smith et al. | 219/756 |
| 4,508,947 | 4/1985 | Eke . | |
| 4,667,075 | 5/1987 | Sakurai . | |
| 4,904,837 | 2/1990 | Low et al. . | |
| 4,935,593 | 6/1990 | Nishikawa . | |
| 5,099,649 | 3/1992 | Zorn . | |
| 5,235,150 | 8/1993 | Buske et al. . | |
| 5,276,300 | 1/1994 | Low et al. . | |
| 5,338,922 | 8/1994 | Kim et al. | 219/763 |
| 5,347,109 | 9/1994 | Nakabayashi et al. . | |
| 5,365,043 | 11/1994 | Bradford | 219/756 |
| 5,369,255 | 11/1994 | Sherer et al. . | |

*Primary Examiner*—Philip H. Leung
*Attorney, Agent, or Firm*—The Brotman Group; Harris F. Brotman

[57] ABSTRACT

A microwave oven adapted for use within a motor vehicle dashboard area. The microwave oven has a removable storage cassette, and slidable platforms for securing and serving containers of beverages and foods. A motor vehicle featuring a microwave oven in which food may be heated by a microwave-generating magnetron powered directly or indirectly by the vehicle's battery and/or alternator. The space required for the microwave oven is provided by elimination of the major dashboard storage compartment, i.e., the glove compartment. The microwave oven door opens to a horizontal position to provide a securing and serving surface for hot beverages and food. The microwave oven accommodates a removable storage cassette for glove compartment items. The storage cassette must be removed as one condition, and the door of the microwave oven must be closed as a second condition for the magnetron to receive electrical power.

31 Claims, 3 Drawing Sheets

MICROWAVE OVEN WITH REMOVABLE STORAGE CASSETTE IN DASHBOARD OF MOTOR VEHICLE

BACKGROUND OF THE INVENTION

This invention relates to the design of a microwave oven for a motor vehicle, the oven being configured and adapted to fit into the dashboard area, and, in one aspect, into the space traditionally reserved for the glove compartment, the oven also providing glove compartment storage space within an insertable cassette which is removed to allow microwave heating.

A variety of mechanical and electro-mechanical patents demonstrate space-saving modifications and multiple usage features in the design of microwave ovens, while other patents focus on the provision of regulated electric power and control features needed in adapting microwave oven technology to motorized vehicles including automobiles, boats and the like. For example, Buske et al., U.S. Pat. No. 5,235,150 describe a two-part space-saving microwave oven including a compact microwave-producing deck portion, and a removable (storable) chamber cover. Smith et al., U.S. Pat. No. 4,481,395 describe a volume-restricting insertable heating compartment for the microwave oven which functions to limit the volume of food being heated at any time. Eke, U.S. Pat. No. 4,508,947 describes a portable microwave oven which provides thermal as well as microwave energy, and an air fan and food turntable to optimize the cooking uniformity and quality of the oven. Sherer et al, U.S. Pat. No. 5,369,255 describe a combined microwave oven and food carrier which can be powered by a motor vehicle battery. Directly and remotely controlled door lock and safety interlock electrical switches applicable to safe operation of microwave ovens are described by Takayama et al., U.S. Pat. No. 3,823,294, by Schuchert, U.S. Pat. No. 4,201,901, by Nishikawa, U.S. Pat. No. 4,935,593, by Shimizu et al. in U.S. Pat. No. 4,450,335, and by Ishikawa et al., U.S. Pat. No. 3,700,846. A number of other patents have focussed on methods and designs for improving the AC and/or DC power supplies, and control functions for microwave ovens in motorized vehicles. Nakabayashi et al., U.S. Pat. No. 5,347,109 describe a vehicular DC power source, an inverter, a magnetron, and a feedback circuit for controlling the inverter output based upon measurement of the DC output. Low et al., U.S. Pat. Nos. 4,904,837 and 5,276,300 describe microwave ovens for transports such as vehicles, in which the oven may be powered either by either AC current, or by DC current through an inverter, and the resultant AC power is delivered through a door interlock safety switch to a high voltage transformer, and then to a magnetron. Sakurai et al., U.S. Pat. No. 4,667,075 describe a microwave oven for vehicles in which the electrical alternator of a vehicle generates three phase AC voltage which is supplied to a transformer, whose secondary connects to rectifying diodes whose output in turn, powers the positive terminal of the magnetron which is connected in turn, via its heater and negative terminals to the positive and negative battery terminals respectively.

Applicant has found very little prior art relating to the placement of a microwave oven within a vehicle, oven door design geometry, oven door movement relating to use within a motor vehicle, or multiple uses for a space occupied by a microwave oven in a motor vehicle. Nahabayashi et al., U.S. Pat. No. 5,347,109, show a microwave oven located in the motor vehicle console area, a storage area located between the two front seats of the automobile. Their patent indicates that the oven is not constrained to this location. However, the patent of Nahabayashi et al. shows only a conventional front-access microwave oven door, and when the oven is placed between the two front seats, access to the oven chamber appears awkward at best. Unfortunately, it would not be possible to remedy their access problem by simply rotating the oven of Nahabayashi et al., and mounting it with its door opening upward. Among other reasons, the containers for "fluid food" as shown in the mounted container supports of Nahabayashi et al. would immediately spill their fluid contents. In other prior art, Schuchert, U.S. Pat. No. 4,201,901 shows a drop-down bottom-hinged door which, when opened, activates a safety interlock switch which interrupts electrical power in a conventional microwave oven. Door movement is controlled by spring-tensioned counterbalance arms which contact and control safety interlock power switches. There is no suggestion that the drop-down door is adaptable for use in a motor vehicle, or adaptable by further modification for holding hot beverages and other foods. In a prior art reference unrelated to microwave ovens, and related only to chilled glove compartments, Zorn, U.S. Pat. No. 5,099,649 describe a Peltier-type refrigeration element placed in a flexible insulated bag which, in turn, is placed inside a vehicle glove compartment. The device is constructed so that when refrigeration is not needed, the bag may be collapsed within the glove compartment, and the compartment used for storage. However, re-deploying the refrigerated bag requires that items stored on top of the collapsed insulated bag be relocated before the insulated bag could be used again.

SUMMARY OF THE INVENTION

This invention features the design of a microwave oven for motor vehicle use. Accordingly, an aspect of the invention is a motor vehicle comprising the microwave oven of the invention. The oven, which comprises a cavity, is configured and arranged to fit into the dashboard area, and in one aspect of the invention, the oven is suitable for the space traditionally reserved for the glove compartment. In one aspect of the invention, the cavity further comprises a storage cassette which is removed from the cavity as a condition for operating the oven. The oven has a door. In one embodiment of the invention, the oven door, hinged at or near its bottom edge, opens downwardly to a horizontal position to provide a stable food and beverage-holding and serving surface. The oven can also store glove compartment items within a removable storage cassette. The storage cassette, while positioned in the oven space, blocks microwave heating via a safety interlock switch coupled with at least one door-activated safety interlock switch. As an alternate location, the microwave oven can be configured and arranged to fit between the two front seats of the vehicle. In this case, the oven includes an upwardly opening top door which provides direct hand access, i.e., downwardly reaching hand access, to heated foods and beverages in the microwave oven, by the driver or the passenger(s). This oven arrangement also allows storage of items within a removable storage cassette which is downwardly inserted into the oven chamber. The cassette must be removed before the oven can operate.

In the prior art it is appreciated that a microwave oven is a very desirable appliance for heating foods and beverages in a motor vehicle. Further, it is recognized that a vehicle such as an automobile, truck, or boat can safely and conveniently provide sufficient power source means, such as well-regulated AC and/or DC current for powering typical commercially available magnetrons found in conventional microwave ovens.

Applicant has examined the location of storage spaces in the automobile and truck, and determined that free or underutilized space in most contemporary motor vehicles is rare to non-existent. However, Applicant also believes that through a gradual process of evolution, many items which were formerly stored in the dashboard area, in particular, the dashboard glove compartment, are now stored in new more accessible door pockets, seat pockets, and a centrally located storage console located between the two front seats. Accordingly, the utility of the traditional dashboard glove compartment has diminished along with its uniqueness as a storage space. Applicant has obtained the dimensions and available volume of typical automotive glove compartments, as well as examined free space behind the engine compartment firewall which is in close proximity to the rear of the glove compartment. It has been determined that adequate space exists in both locations to accommodate a small microwave oven cavity or chamber and the accompanying electronics. In vehicles with spacial limitations, power source means, which include some of the larger electrical components such as the high voltage transformer and the power inverter, can be placed behind the engine firewall.

One aspect of the invention is a dual use vehicular microwave oven which is configured and arranged to fit into the dashboard area, and particularly into the space previously occupied by the dashboard glove compartment (or alternatively, into the console area between the two front seats), while also providing convenient and unitized storage of miscellaneous items, such as audio recording tapes, compact disks, facial tissue, cosmetic products, and small automotive tools, in the same space within a removable storage cassette when the oven is not heating.

Another object of the invention is to provide, within a vehicular dashboard area, a microwave oven with a downwardly opening front door whose interior surface provides securing, serving, and spill-containing means for hot beverages and foods.

Still another object of the invention is to provide, within a vehicular dashboard area, a microwave oven with a side-opening front door which is hinged either on the driver's side or on the passenger door side.

A further object of the invention is to allow beverages secured against spilling within a vehicular microwave oven, to be safely and conveniently moved out of the microwave oven for serving while still being secured against spilling.

Still another object of the invention is to provide a motor vehicle comprising an embodiment of the oven of the invention as described herein by the detailed descriptions and limited in so far as the claims.

The above, and other objects of the present invention are achieved with a microwave oven of the invention or achieved with a vehicle which includes a microwave oven of the invention. The microwave oven comprises a cavity in which oven foods and beverages may be heated by a microwave-generating magnetron powered directly or indirectly by power source means such as the vehicle's battery and/or alternator. The microwave oven is configured and arranged within the dashboard area of the motor vehicle. In an embodiment of the invention, the oven includes a downwardly opening front door. In an aspect of the invention, the space required for the microwave oven is provided by elimination of the major dashboard storage compartment, also known as the glove compartment. Alternatively, the microwave oven is configured and arranged between the two front seats of the motor vehicle, and the oven includes an upwardly opening top door providing direct vertical access to heated foods and beverages. The top door must be closed as a condition for the magnetron to receive electrical power.

Regardless of location, one embodiment of the microwave oven accommodates a removable storage cassette for miscellaneous items. In embodiments of the invention comprising a storage cassette, the cassette must be removed as one condition, and the door of the oven must be closed as a second condition for the magnetron to receive electrical power. The removable storage cassette in the microwave oven provides storage space for items previously contained within the glove compartment of the motor vehicle. The removable storage cassette preferably includes closure means, such as a hinged door or other closure which when closed, prevents the items in this cassette from being displaced and/or lost.

Other embodiments achieve the objectives of the invention. The microwave oven comprises a cavity in which foods and beverages may be heated by a microwave-generating magnetron powered directly or indirectly by power source means, such as the vehicle's battery and/or alternator. The microwave oven is configured and arranged within the dashboard area of the motor vehicle. In one version of the invention, the space required for the microwave oven is provided by elimination of the major dashboard storage compartment, also known as the glove compartment, previously located within the dashboard, the interior surface of the door being configured and fitted with a securing and serving means for heated beverages and/or food.

With the dashboard location for the oven, the interior surface of the microwave oven and the door are also preferably configured and arranged to control and contain any accidental spillage of heated beverages and/or food. More specifically, with the microwave oven door opening downwardly to a substantially horizontal position for serving food, the interior surface of the door is preferably formed with a concavities or recessed areas to contain any accidental spillage of beverages and/or food onto the door. The floor of the oven is similarly designed to contain any accidental spillage of beverages and/or food.

Regardless of location within the motor vehicle, the microwave oven also preferably includes a holding means for at least one beverage cup within the oven. With the dashboard location for the oven, the holding means is preferably slideable, liftable or otherwise movable onto the interior surface of the door when it has been opened to a substantially horizontal position. The holding means can be formed as a securing and serving platform. The interior surface of this door preferably includes at least one transport device selected from the group including slide tracks, rollers, and the like. This device facilitates smooth translocation of the holding means from inside the microwave oven onto the door when it has been opened to a substantially horizontal position. The holding means configured as a securing and serving platform is preferably a tray which includes at least one horizontal round hole of a diameter suitable for securing a beverage cup against spillage. Other variations of trays and configurations for securing beverage cups, bowls, and other food items or serving utensils are contemplated by the invention, and are well known in the art.

The outer perimeter of the microwave oven door preferably includes a shock-absorbent material such as cushioned vinyl to protect the occupants of the vehicle in the event of a collision. As additional safety features, the microwave oven also preferably includes at least one safety interlock means preventing microwave oven door opening when the motor vehicle is moving. As an alternative arrangement for this safety feature, the microwave oven can include at least one safety interlock means which blocks power to the magnetron as well as preventing microwave oven door opening when the motor vehicle is moving.

In another embodiment of this invention, a microwave oven comprising a cavity is adapted for use within a motor vehicle dashboard area. Foods and beverages may be heated by a microwave-generating magnetron powered directly or indirectly by power source means, such as the vehicle's battery and/or alternator. In an embodiment of the invention, the space required for integrating the microwave oven is provided by elimination of the major dashboard storage compartment, i.e., the glove compartment. In one embodiment, the microwave oven accommodates a removable storage cassette which must be removed as one condition, the door of the microwave oven being closed as a second condition for the magnetron to receive electrical power.

In a variation of the above embodiment, a microwave oven is adapted for use within a motor vehicle dashboard area, foods and beverages may be heated by a microwave-generating magnetron powered directly or indirectly by a power source, such as the vehicle's battery and/or alternator. The space required for integrating the microwave oven is provided, in one aspect by elimination of the major dashboard storage compartment, i.e., the glove compartment. In another aspect, the door of the microwave oven opens downwardly to a substantially horizontal position for serving food, with the interior surface of the door being configured and fitted with a securing and serving means for heated beverages and/or food.

In still another embodiment, a microwave oven is adapted for use between the two front seats of a motor vehicle. Foods and beverages may be heated by a microwave-generating magnetron powered directly or indirectly by power source means. The microwave oven includes an upwardly opening top door providing direct access to foods and beverages in the microwave oven. The top door of the oven must be closed as a condition for the magnetron to receive electrical power.

In the immediately preceding three embodiments, it is preferred that the microwave oven further include at least one safety interlock means which prevents microwave oven door opening when the motor vehicle is moving. Alternatively, it is preferred that the microwave oven further include at least one safety interlock means which blocks power to the magnetron and prevents microwave oven door opening when the motor vehicle is moving.

Other features and advantages of the invention will be apparent from the following description of the preferred embodiments, and from the claims.

DESCRIPTION OF THE PREFERRED EMBODIMENTS

DRAWINGS

Figure 1:
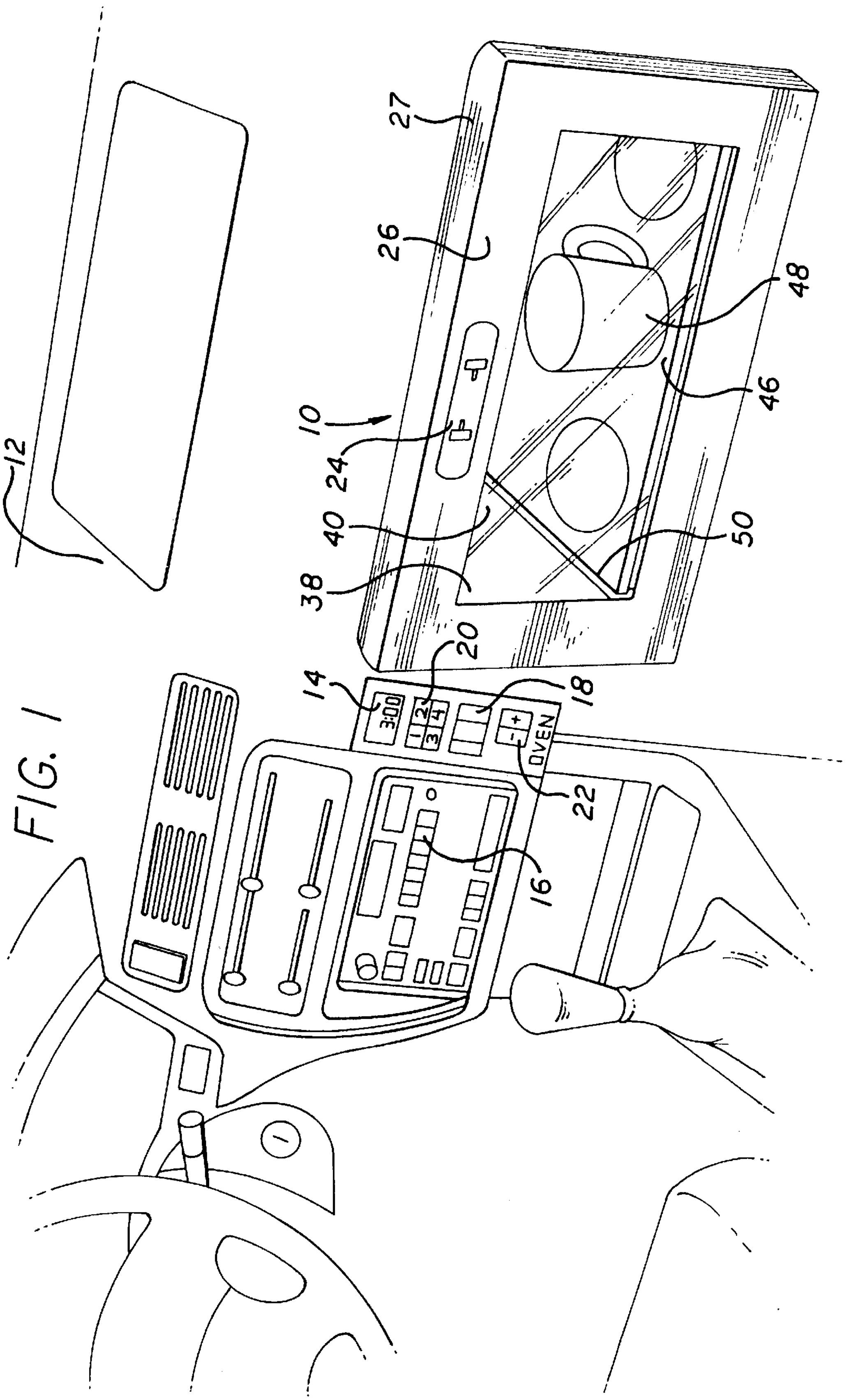
FIG. 1 is a perspective view of a microwave oven integrated into a motor vehicle dashboard.
Figure 2:
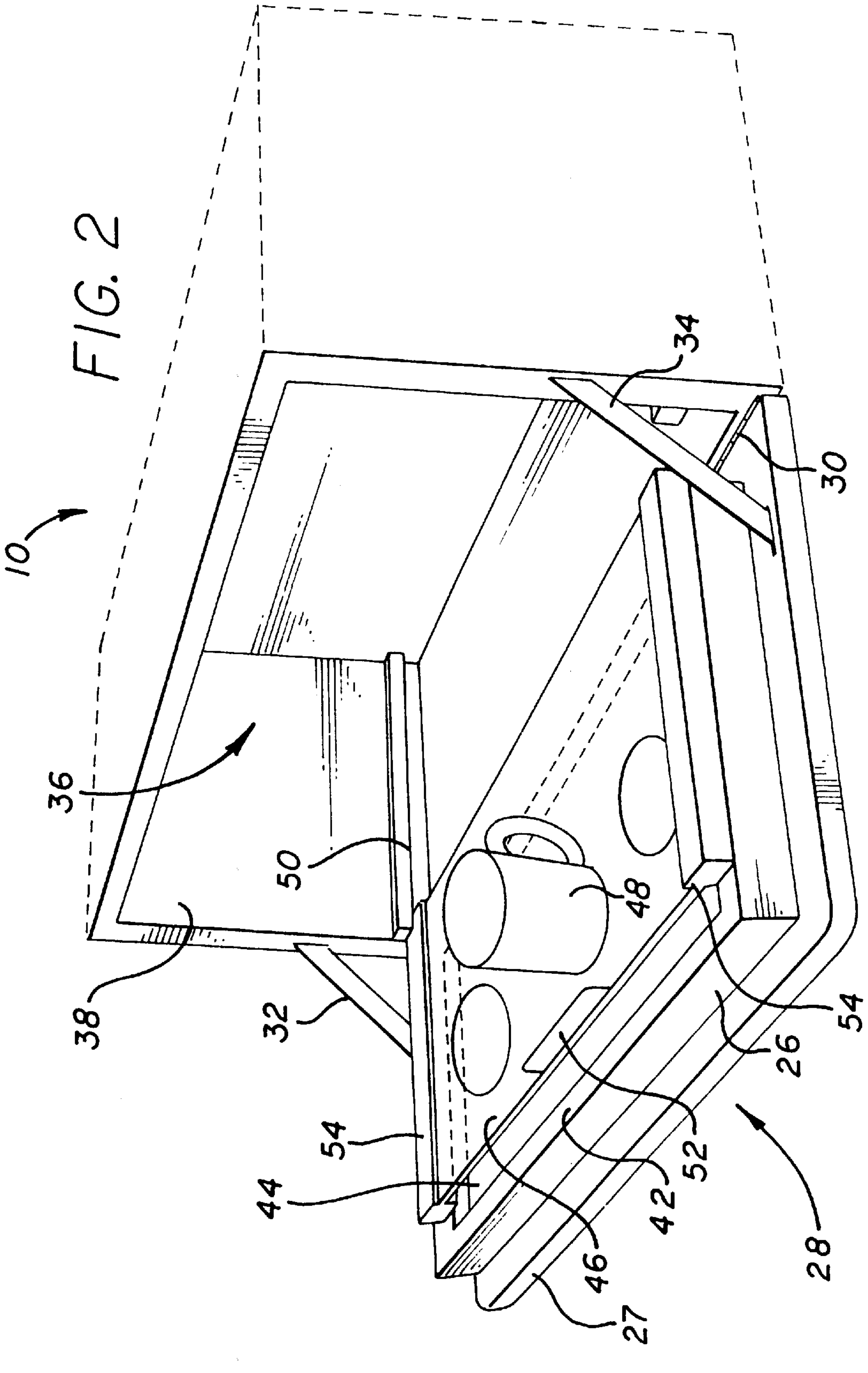
FIG. 2 is a perspective view of the microwave oven in FIG. 1 in greater detail, showing a slide-out holding means which secures beverage containers for use during microwave heating and during beverage serving on the oven door.
Figure 3:
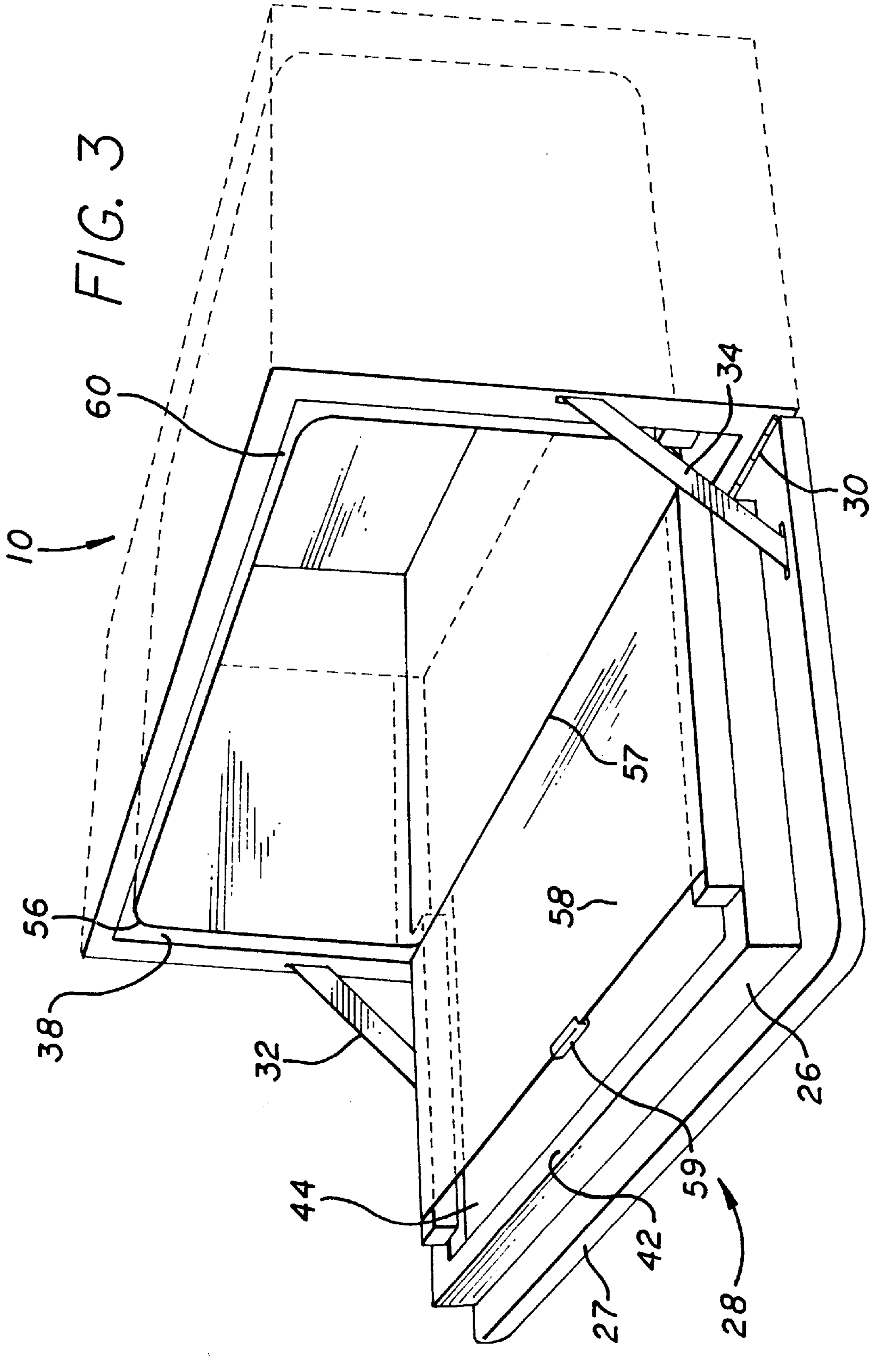
FIG. 3 is a perspective view of the microwave oven in FIG. 2, showing a removable storage cassette for miscellaneous items inserted into the oven.

Referring to FIGS. 1, 2 and 3, microwave oven 10 has been designed for integration into the dashboard area 12 of a motor vehicle. FIG. 1 shows a preferred positioning of the oven in the area previously occupied by the glove compartment. Electronic controls 14 for the operation of the oven are preferably placed in proximity to other dashboard controls such as the audio system controls 16, and can be accessed by either the passenger or the driver in the front seats of the vehicle. The manually programmed electronic controls 14 include all of the standard controls for a microwave oven such as timer 18, power setting 20, and on/off switch 22. The automatic electronic controls (not shown) preferably include at least (i) a door locking control which is linked to a vehicle movement sensor (detecting, for example, wheel rotation) and which serves to prevent door opening while the vehicle is moving, and (ii) a power-interrupt switch coupled to the door's physical closing and/or latching, which functions to block electrical power to the microwave-generating magnetron (not shown) if the door is not completely closed. Power source means include the source and regulation of high voltage powering the magnetron, and the associated electronic components, and is described in the prior art as discussed above, and are not shown or discussed here. As a safety feature, the outer portion of the door latch 24 may be recessed into the frame 26 of the microwave oven door assembly 28 (hereinafter abbreviated "door") as shown in FIG. 1. Frame 26 and the outer perimeter 27 of the door 28 preferably include shock-absorbent material as discussed earlier.

In FIGS. 2 and 3, door 28 is shown to open downwardly on bottom hinge 30. In other aspects of the invention, the door is a side-opening door, with hinges and door latch appropriately located on the either the driver's side or the passenger door side of the frame 26. Door support arms 32 and 34 limit the downward movement of the door to a horizontal position while supporting the weight of the door (and objects placed on the door). The door support arms 32 and 34 are spring-tensioned to prevent the door 28 from dropping open abruptly.

Microwave oven cavity 36 is defined by interior walls 38 and door 28. The window 40 and door 28, together absorb and block outward leakage of microwave radiation from inside cavity 36. The interior surface 42 of door 28 is configured to control and contain any spillage of heated beverages and/or food onto the door. This can be achieved by forming at least one concavity or recessed area in the interior surface of the door, such as a recessed area 44 for containing any spills of hot beverages. A holding means in the form of a securing and serving platform, such as a tray 46 for cups of hot beverages 48 is mounted in a slide-track 50 within the oven cavity 36. Upon opening door 28 to a horizontal position, the serving tray 46 can be translocated over translocating means by sliding the tray out onto the interior surface 42 of door 28 by pulling forward on tray handle 52. Forward and lateral movement of serving tray 46 is limited by tracks 54 mounted on the interior surface 42 of door 28. For securing and supporting other food containers (other than beverage cups), during heating and serving, additional trays with different support geometries (not shown) are provided.

In FIG. 3, a removable storage cassette 56 is shown inserted into microwave oven cavity 36. When the microwave oven 10 is not being used as a heating appliance, storage cassette 56 provides storage space within the microwave oven for miscellaneous items previously contained within the dashboard glove compartment of the motor vehicle. The storage cassette comprises closure means 57,

58 (such as a hinged door) which when closed prevents the items in the cassette from being displaced or lost. A hinge 57 connects storage cassette door 58 to storage cassette 56. When the door 58 is closed and secured by means of a latch or magnetic strip 59, loose items are prevented from falling out of the storage cassette 56 when it is removed from the microwave oven prior to microwave operation. An additional power-interrupt safety switch (not shown) is provided as an automatic electronic control to prevent microwave oven operation when the storage cassette 56 is inside the microwave oven cavity 36. This safety switch (e.g., a spring-loaded button-type switch) is positioned on one of the interior walls 38 of the microwave oven cavity 36, and is contacted by one of the exterior wall surfaces 60 of storage cassette 56 as the cassette is inserted into the microwave oven 10.

With regard to the size of the microwave oven, the approximate inner dimensions for the heating cavity or chamber typically measure 10–12 inches in width, 7–9 inches in depth and 4–6 inches in height. This cavity size will accommodate either several beverage cups or several heat-and-serve frozen dinners, for example. Precise cavity size and placement of the electronic components providing high voltage to the magnetron will depend upon the individual vehicle, its dashboard, and available space within and behind the dashboard, such as behind the motor chamber firewall. Construction of the chamber walls and other elements shielding vehicle passengers from microwave radiation are described in the prior art. Similarly, selection of power source means, such as inverters to generate AC power from the battery and transformers to generate high voltage to drive the magnetron, or alternatively selection of components such as diodes to rectify transformer-boosted three phase AC voltage from the vehicle alternator to drive the magnetron, as well as selection of oven controls and safety interlocks to lock the door and shut off electrical power to the magnetron are all choices which can be made from the prior art.

When integrated into the dashboard area location, the microwave oven door opens downward like the traditional glove compartment door to prevent physical interference with other vehicle control features, and to provide a horizontal serving surface for heated foods. Unlike the horizontally hinged microwave oven door seen in Schuchert, U.S. Pat. No. 4,201,901, the presently invented oven door becomes a secure food serving platform (i.e. securing and serving means) when extended downward. In one aspect of the invention, the microwave oven cavity is fitted with any one of several holding means such as a securing and serving platform in the form of a slide-out tray having circular holes to support one or more beverage cups. Following heating, the holding means is preferably translocated over translocating means and secured on the interior surface of the microwave oven door which has been opened to a horizontal position for serving food. The transfer of such a beverage and food holding tray from the oven interior can be accomplished by lifting or preferably sliding it continuously using translocating means onto the door surface to prevent spillage. The interior surface of the microwave oven door and/or the holding tray may include slide tracks, rollers, clips, or other means to facilitate a smooth translocation of the tray and prevent spillage of hot beverages during the translocation process. If the interior surface of the oven door is formed with one or more concavities, (concave surface or recessed central area) any accidental spill of liquid onto the door can be easily contained. As a further feature of the present invention, any one of the beverage container supports, holding trays, securing and serving means or platform or other beverage container securing means located inside or outside the microwave oven, may include at least one gimbal mounting means, i.e., gimbal mounting rings, for holding a beverage container. This type of mounting allows the beverage container to tilt with the vehicle's motion, thereby preventing spillage.

The outer perimeter of the door is provided with a shock-absorbent material such as cushioned vinyl. This modification minimizes any potential collision-related injury to the occupants of the vehicle with the microwave oven door either open or closed. Any one of a variety of electrically integrated safety interlock features are also incorporated into the door opening function to prevent microwave operation when the door is partially or fully open, as in Schuchert, U.S. Pat. No. 4,201,901.

In addition to the incorporation of standard safety interlock features such as the interruption of electrical power to the magnetron if the oven door is ajar or opened during the microwave heating cycle, several other safety interlock features must be considered in the present invention. These features are important for the safety of the vehicle occupants, and for minimizing any liability on the part of the manufacturer resulting from hot food injuries. In particular, these interlock features should prevent oven door opening under any one of a variety of vehicle operating conditions which could cause spilling of hot beverages or food. In the most conservative approach, vehicular movement would block power to the magnetron and keep the microwave oven door locked. Heating and door opening would require a vehicle to be fully stopped. Using a more moderate approach, microwave heating could be permitted to proceed with the vehicle moving, but door opening would require the vehicle to be fully stopped. In any event, the door opening process should cause an immediate audible signal, alerting the driver to avoid any sudden start-up acceleration of the vehicle which could result in a food spill.

Alternatively, if still fewer restrictions for oven operation are deemed appropriate, prevention of door opening might be limited only by vehicle acceleration, deceleration, or hard cornering (producing a centrifugal force). There is little doubt that opening the microwave oven and retrieving a hot beverage under these circumstances could cause a burn from spilled liquid. Detection means for such vehicle movements and operating conditions are well known in the art, as in Nakabayashi et al., U.S. Pat. No. 5,347,109. These detection means can be used to control electrical power to the magnetron, and power to the mechanism locking and/or unlocking the door of the oven.

It is understood that one aspect of the oven comprises a cavity and that another aspect of the oven includes a cavity within which is fitted a removable and insertable storage cassette. The present invention thus includes the design of a storage cassette for insertion into the microwave oven. This feature permits dual use of the space, i.e., use of the microwave oven as a storage compartment when the heating function is not required. The storage cassette is configured by size and shape to occupy most or all of the cavity in the oven. In the dashboard area location, the cassette includes a large front opening (like the glove compartment) for easy access. The cassette is fabricated using a material such as ABS plastic, polyethylene or polypropylene which can provide a thin but robust shell. The cassette optionally includes a closure means, such as a hinged front flap door which may be folded backward and out of the way, e.g., under the bottom surface of the cassette when the cassette is inserted into the microwave oven. When the cassette is removed from the oven, the flap door can be closed and secured by a latch, a snap closure, or a Velcro®-type strip, for example, to secure the contents within the cassette. While the microwave oven is being used for heating food, the free storage cassette with its contents may be temporarily placed or stowed in the foot well area of the vehicle. If space permits, the cassette can be secured in this area using, for example, either an elastic strap, a clip, or one or more guide tracks.

Other features and embodiments of the invention are not limited by the foregoing description, and are to be found within the following claims.

What is claimed is:

1. A microwave oven adapted for use within a motor vehicle dashboard area, said oven comprising a cavity wherein foods and beverages are heated by a microwave generating magnetron powered directly or indirectly by power source means, said microwave oven being configured within the dashboard area of said motor vehicle, said cavity accommodating a removable storage cassette, means electrically connected to said power source means and said magnetron for preventing said magnetron from receiving electrical power when the storage cassette is inside said cavity, said microwave oven having a door.

2. The microwave oven of claim 1 wherein said power source means is selected from the group consisting of battery, alternator, and vehicle motor.

3. The microwaven oven of claim 1 configured and arranged within a glove compartment.

4. The microwave oven of claim 1 wherein said removable storage cassette provides storage space for miscellaneous items.

5. The microwave oven of claim 1 wherein said removable storage cassette comprises a closure means which when closed, prevents the items in said cassette from being displaced and/or lost.

6. The microwave oven of claim 1 wherein the door of said microwave oven opens downwardly to a substantially horizontal position for serving food or beverages upon the interior surface of the door.

7. The microwave oven of claim 6 wherein said interior surface of said door is fitted with a securing and serving means for securing and serving heated beverages and/or food.

8. The microwave oven of claim 6 wherein said interior surface of said door is configured to control and contain any spillage of heated beverages and/or food onto said door.

9. The microwave oven of claim 6 wherein at least one concavity is formed in the interior surface of said door for containing spillage of beverages and/or food onto said door.

10. The microwave oven of claim 1 wherein said cavity further comprises holding means for holding at least one beverage cup within said microwave oven, wherein said holding means is liftable, slideable or otherwise movable onto the interior surface of said door when said door has been opened to a substantially horizontal position.

11. The microwave oven of claim 10 wherein the interior surface of said door comprises translocating means for translocating said holding means from inside said microwave oven to said door when said door is opened to a substantially horizontal position.

12. The microwave oven of claim 11 wherein said translocation means is selected from at least one of the group consisting of consisting of slide tracks, and rollers.

13. The microwave oven of claim 10 wherein said holding means is a tray having a surface in which is formed at least one horizontal round hole of a diameter suitable for holding a beverage cup against spillage.

14. The microwave oven of claim 1 wherein said cavity is fitted with a securing and serving platform, said platform being movable from a first position inside said cavity to a second position outside said cavity from which second position said food and/or beverages can be served, said platform configured to control and contain any spillage of heated beverages and or food.

15. The microwave oven of claim 1 wherein the outer perimeter of said door comprises a shock-absorbent material such as cushioned vinyl.

16. The microwave oven of claim 1 further comprising at least one safety interlock means preventing microwave oven door opening when said motor vehicle is moving.

17. The microwave oven of claim 1 further comprising at least one safety interlock means blocking power to said magnetron and preventing microwave oven door opening when said motor vehicle is moving.

18. A motor vehicle comprising a dashboard area, a microwave oven disposed in the dashboard area, said oven comprising a cavity wherein foods and beverages are heated by a microwave-generating magnetron powered directly or indirectly by power source means within said vehicle, said microwave oven being configured within the dashboard area of said motor vehicle, said cavity accommodating a removable storage cassette, means electrically connected to said power source means and said magnetron for preventing said magnetron from receiving electrical power when the storage cassette is inside said cavity, said microwave oven having a door.

19. A dashboard of a motor vehicle, said dashboard comprising a microwave oven disposed in said dashboard, said oven comprising a cavity wherein foods and beverages are heated by a microwave-generating magnetron powered directly or indirectly by power source means within said vehicle, said oven having a door, and wherein said cavity is fitted with a holding means in the form of a securing and serving platform, said platform slidably secured to a transport device mounted in said oven for translocating said platform from a first position inside said cavity to a second position outside said cavity from which second position said food and/or beverages can be served.

20. The dashboard of claim 19 wherein the power source is selected from the group consisting of battery, alternator, and vehicle motor.

21. The dashboard of claim 19 comprising means electrically connected to said power source means and said magnetron for preventing said magnetron from receiving electrical power when the door of said microwave oven is open.

22. The dashboard of claim 19 wherein the door of said microwave oven opens downwardly to a substantially horizontal position for serving food or beverages upon the interior surface of said door.

23. The dashboard of claim 22 wherein the interior surface of said door is fitted with securing and serving means for beverages and/or food.

24. The dashboard of claim 22 wherein the interior surface of said door is configured to control and contain spillage of heated beverages and/or food onto said door.

25. The dashboard of claim 22 wherein at least one concavity is formed in the interior surface of said door for containing spillage of beverages and/or food onto said interior surface.

26. The dashboard of claim 19 wherein said holding means is a tray having a surface in which is formed at least one hole of a diameter suitable for securing a beverage cup against spillage.

27. The dashboard of claim 19 wherein the outer perimeter of said door comprises shock absorbent material.

28. The dashboard of claim 19 further comprising at least one safety interlock preventing microwave oven door opening when said motor vehicle is moving.

29. The dashboard of claim 19 comprising at least one safety interlock means blocking power to said magnetron and preventing microwave oven door opening when said motor vehicle is moving.

30. The dashboard of claim 19 wherein said transport device is selected from at least one of the group consisting of slides, tracks and rollers.

31. A motor vehicle comprising a dashboard, said dashboard comprising a microwave oven disposed in said dashboard, said oven comprising a cavity wherein foods and beverages are heated by a microwave-generating magnetron powered directly or indirectly by power source means within said vehicle, said oven having a door, and wherein said cavity is fitted with a holding means in the form of a securing and serving platform, said platform slidably secured to a transport device mounted in said oven for translocating said platform from a first position inside said cavity to a second position outside said cavity from which second position said food and/or beverages can be served.

* * * * *